United States Patent
Barnes

(10) Patent No.: US 10,252,691 B2
(45) Date of Patent: Apr. 9, 2019

(54) CUSHION PROTECTOR FOR SNAP-ON IP CHUTE

(71) Applicant: GM Global Technology Operations LLC, Detroit, MI (US)

(72) Inventor: William J. Barnes, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/157,884

(22) Filed: May 18, 2016

(65) Prior Publication Data

US 2016/0355153 A1 Dec. 8, 2016

Related U.S. Application Data

(60) Provisional application No. 62/172,567, filed on Jun. 8, 2015.

(51) Int. Cl.
| | | |
|---|---|---|
| *B60R 21/201* | (2011.01) | |
| *B60R 21/2165* | (2011.01) | |
| *B60R 21/217* | (2011.01) | |
| *B60R 21/215* | (2011.01) | |
| *B60R 21/205* | (2011.01) | |
| *B60R 21/16* | (2006.01) | |

(52) U.S. Cl.
CPC .......... *B60R 21/215* (2013.01); *B60R 21/201* (2013.01); *B60R 21/217* (2013.01); *B60R 21/205* (2013.01); *B60R 21/2165* (2013.01); *B60R 2021/161* (2013.01)

(58) Field of Classification Search
CPC . B60R 21/201; B60R 21/2176; B60R 21/215; B60R 21/217; B60R 21/205; B60R 21/2165; B60R 21/206; B60R 2021/161; B60R 2021/21512; B60R 2021/21531; B60R 2021/2172; B60R 2021/23169
USPC .............................. 280/728.3, 732
See application file for complete search history.

(56) References Cited

U.S. PATENT DOCUMENTS 5,452,913 A * 9/1995 Hansen ................. B60R 21/201
280/728.1
5,588,674 A * 12/1996 Yoshimura ............. B60R 21/16
280/728.1

(Continued)

FOREIGN PATENT DOCUMENTS

| CN | 1539681 A | 10/2004 |
|---|---|---|
| DE | 19813054 A1 | 10/1999 |

(Continued)

OTHER PUBLICATIONS

German Office Action dated Sep. 13, 2016 ; Application No. 10 2106 110 398.5; Applicant: GM Global Technology Operations LLC.; 8 pages.

(Continued)

*Primary Examiner* — Keith J Frisby
(74) *Attorney, Agent, or Firm* — BrooksGroup

(57) ABSTRACT

A number of variations may include a product comprising an airbag cushion protector constructed and arranged to be place in an airbag chute and so that a first portion of the airbag cushion protector covers the edges of an airbag door during deployment of an airbag cushion and so that the first portion of the protector is interposed between the edges of the airbag door and the airbag cushion throughout deployment of the airbag.

5 Claims, 13 Drawing Sheets

(56) References Cited

U.S. PATENT DOCUMENTS

| | | | | |
|---|---|---|---|---|
| 6,131,944 A | * | 10/2000 | Henkel | B60R 21/16 |
| | | | | 280/728.3 |
| 6,474,686 B1 | * | 11/2002 | Higuchi | B60R 21/203 |
| | | | | 280/731 |
| 7,152,879 B2 | * | 12/2006 | Kai | B60R 21/2338 |
| | | | | 280/743.2 |
| 2003/0189319 A1 | | 10/2003 | Soderquist | |

FOREIGN PATENT DOCUMENTS

| | | | |
|---|---|---|---|
| DE | 102004023780 | * | 6/2006 |
| DE | 102004023780 A1 | | 6/2006 |
| DE | 102014110697 A1 | | 2/2015 |
| EP | 2145802 A1 | | 1/2010 |

OTHER PUBLICATIONS

Chinese Office Action dated Dec. 27, 2017 ; Application No. 201610620411.X; Applicant: GM Global Technology Operations LLC.; 9 pages.

* cited by examiner

CUSHION PROTECTOR FOR SNAP-ON IP CHUTE

CROSS-REFERENCE TO RELATED APPLICATIONS

This application claims the benefit of U.S. Provisional Application Ser. No. 62/172,567 filed Jun. 8, 2015.

BRIEF DESCRIPTION OF THE DRAWINGS

Select examples of variations of the invention will become more fully understood from the detailed description and the accompanying drawings, wherein.

DETAILED DESCRIPTION OF ILLUSTRATIVE VARIATIONS WITHIN THE SCOPE OF THE INVENTION

The following description of the variations is merely illustrative in nature and is in no way intended to limit the invention, its application, or uses.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

A number of variations may include a product comprising an airbag cushion protector constructed and arranged to be place in an airbag chute and so that a first portion of the airbag cushion protector covers the edges of an airbag door during deployment of an airbag cushion and so that the first portion of the protector is interposed between the edges of the airbag door and the airbag cushion throughout deployment of the airbag.

In a number of variations the airbag cushion protector includes a first portion and a second portion held together by a line of weakness so that the airbag cushion protector is torn along the line of weakness so that the first portion of the airbag cushion protector covers the edges of an airbag door during deployment of an airbag cushion and so that the first portion of the protector is interposed between the edges of the airbag door and the airbag cushion throughout deployment of the airbag.

In a number of variations the airbag cushion protector may include a plurality of spaced apart slots formed therein wherein each slot is constructed and arranged to receive a locking tab or locking finger of an airbag chute and so that the airbag cushion protector remains attached to the airbag chute during deployment of an airbag cushion.

In a number of variations an airbag cushion protector may be utilized in any of a variety of airbag types used through a vehicle to protect the airbag cushion from edges of any type of deployment door or deployment material.

Figure 1:
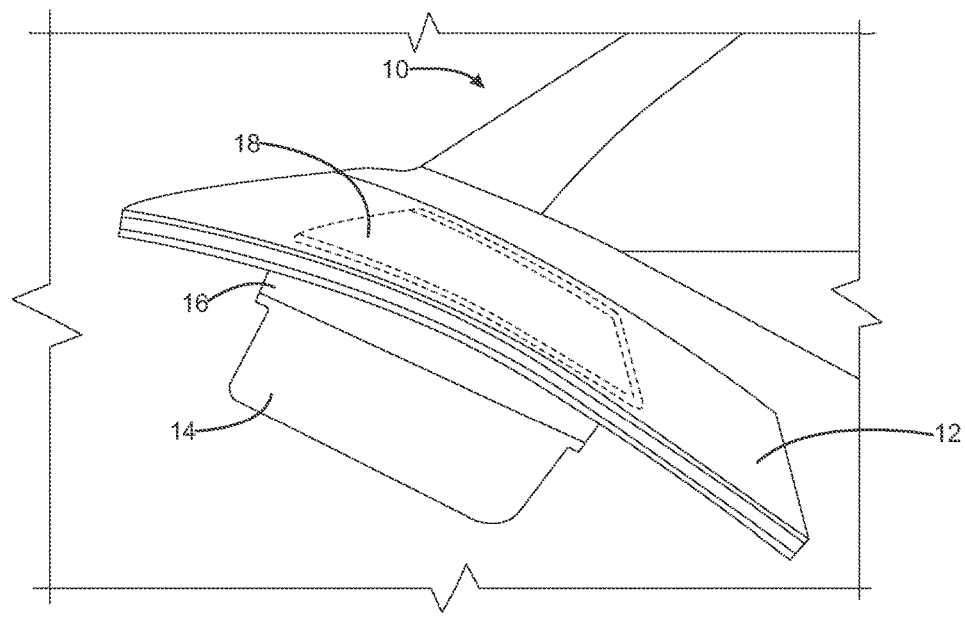
FIG. 1 illustrates a vehicle including an instrument panel airbag assembly according to a number of variations.
Figure 2:
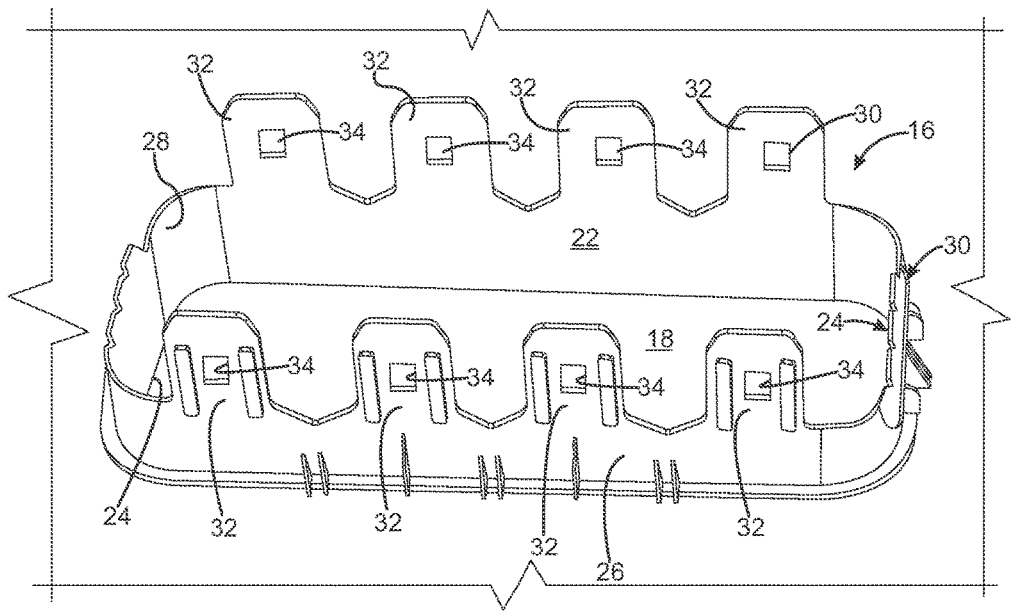
FIG. 2 illustrates an airbag chute according to a number of variations.

In a number of variations an airbag cushion protector may be used in an instrument panel airbag assembly. Referring now to FIGS. 1-2, a number of variations a vehicle 10 may include an instrument panel 12 having a passenger airbag assembly 14 attached to an instrument panel chute 16. Any number of events may cause an airbag cushion 20 (shown in FIGS. 7-8 and 10C-I) housed in the airbag assembly 14 to deploy through an airbag door 18 in the instrument panel 12.

Figure 3:
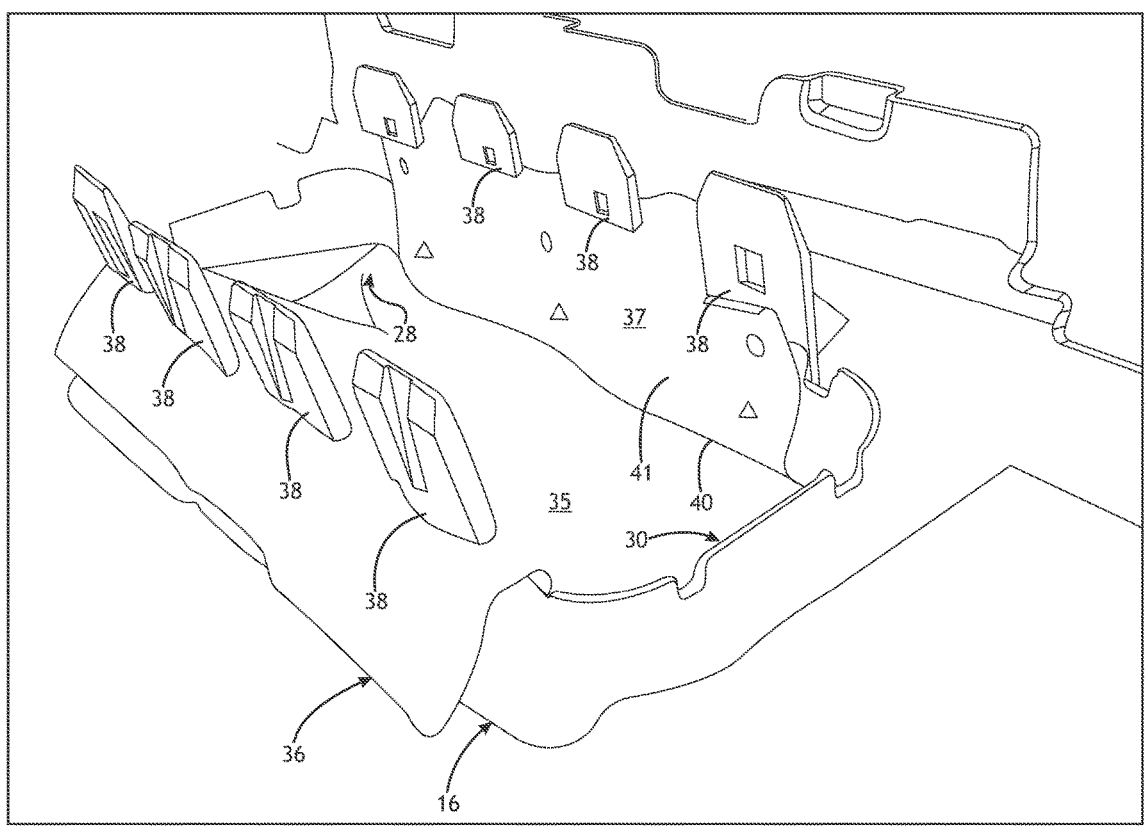
FIG. 3 illustrates a product including an airbag chute and an airbag cushion protector according to a number of variations.

Referring to FIGS. 1-3, in a number of variations an airbag chute may be provided and may include a door 18 portion of the chute jointed to a rear wall 22, a front wall 26, a first end wall 28 and a second end wall 30. A line of weakness 24 may extend along the door 18 at lower edge of the rear wall 22 and lower edge of the first end wall 28 and the second end wall 30 and may be constructed and arranged to allow the door portion 18 to separate from the rear wall 22, first end wall 28 and second end wall 30 during deployment of the airbag cushion 20. The door 18 may be pivotally connected to the front wall 26.

In a number of variations an airbag cushion protector 36 may be placed in the chute 16 and constructed and arranged so that during deployment of the airbag cushion 26 the a first portion 35 of the protector covers the edges of the door 18 or material through which the airbag is deployed. For example, in a number of variations the protector 36 may be placed in a cavity formed an airbag chute 16 for an instrument panel so that the protector covers the door 18 portion of the chute, extends up at least a portion of the rear wall 22, front wall 26, and up at least a portion of the first end wall 28 and second end wall 30. The protector 36 may include a first portion 35 and a second portion 37, which are held together during assembly by a line of weakness 40 or 41. The line of weakness 40 or 41 may be constructed and arranged to tear so that the first portion 35 and the second potion 37 separate during deployment of the airbag cushion and so that the first potion extends beyond the edges of the door 18 or material through which the airbag cushion 20 deploys. For example, the first portion 35 may cover the edge of the door 18 near the rear wall 22 and the edge of the door near the first end wall 28 and the edge of the door near the second end wall 30.

In a number of variations the line of weakness 40 or 41 in the protector 36 may be formed by a line of spaced apart slots formed in the protector material. In a number of variations the line of weakness 40 or 41 may be a different material that is weaker than the remainder of the protector 36. In a number of variation most of the protector may be coated with a material that prevent it from tearing and the line of weakness 40 or 41 may be any uncoated portion allowing the protector to tear during deployment.

In a number of variations the protector may be a polymeric material such as a plastic or thermoset, or the protector may be a fabric such as nylon or cotton. In a number of variations the protector 36 may be coated with a material to reduce friction between the protector 36 and the airbag cushion 20.

Figure 4:
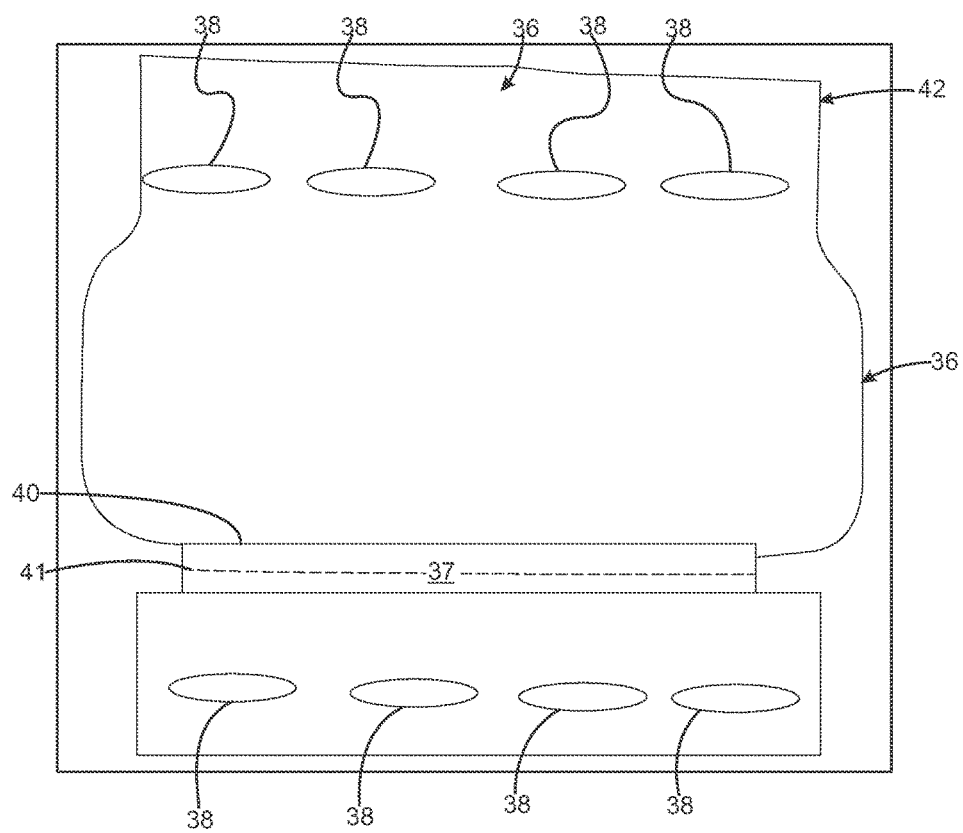
FIG. 4 illustrates a product including and an airbag cushion protector according to a number of variations.

In a number of variations the protector 36 may include a first section 42 which is folded over to provide additional strength and slots 38 may be formed therein. Similarly, a second section may be folded over to provide additional strength and slots 38 may be formed therein, for example as illustrated in FIG. 4. In a number of variations the airbag chute 16 may have a plurality of tabs 32 extending from one or more of the wall 22, 26 (FIG. 2). In a number of variations each tab may be received in a respective slot 38 formed in the airbag cushion protector 36. In a number of variations the tabs 32 may have locking features 34 constructed and arranged to mate with locking feature on an airbag assembly 14 (FIG. 5).

Figure 5:
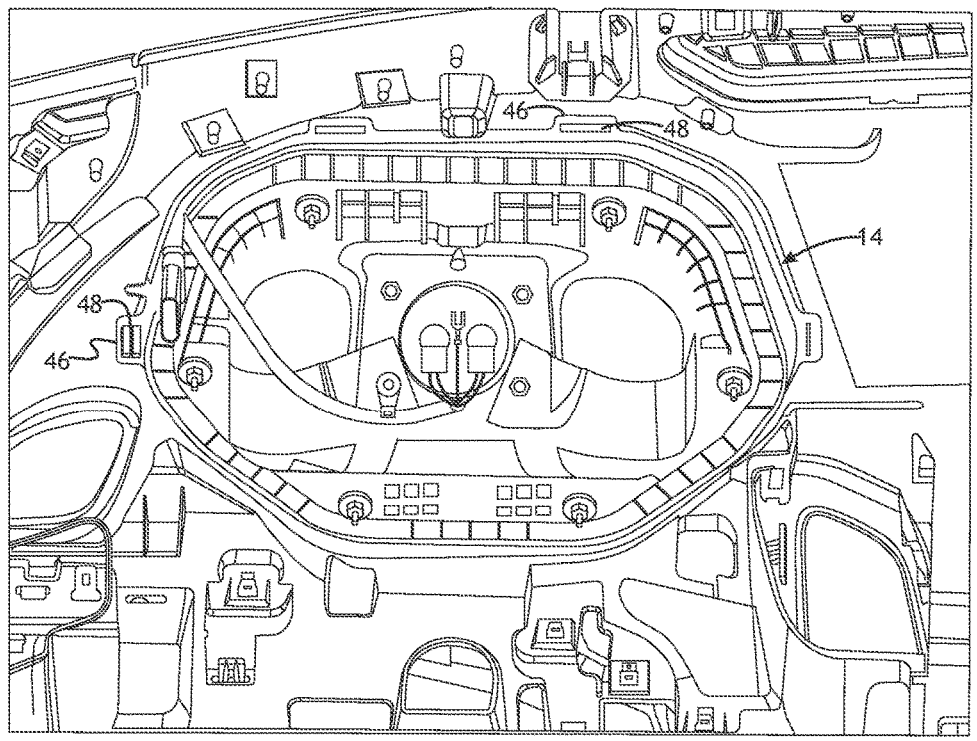
FIG. 5 illustrates a product including a propellant portion of an airbag assembly according to a number of variations.

FIG. 5 illustrates a product including a propellant portion of an airbag assembly according to a number of variations.

Figure 6:
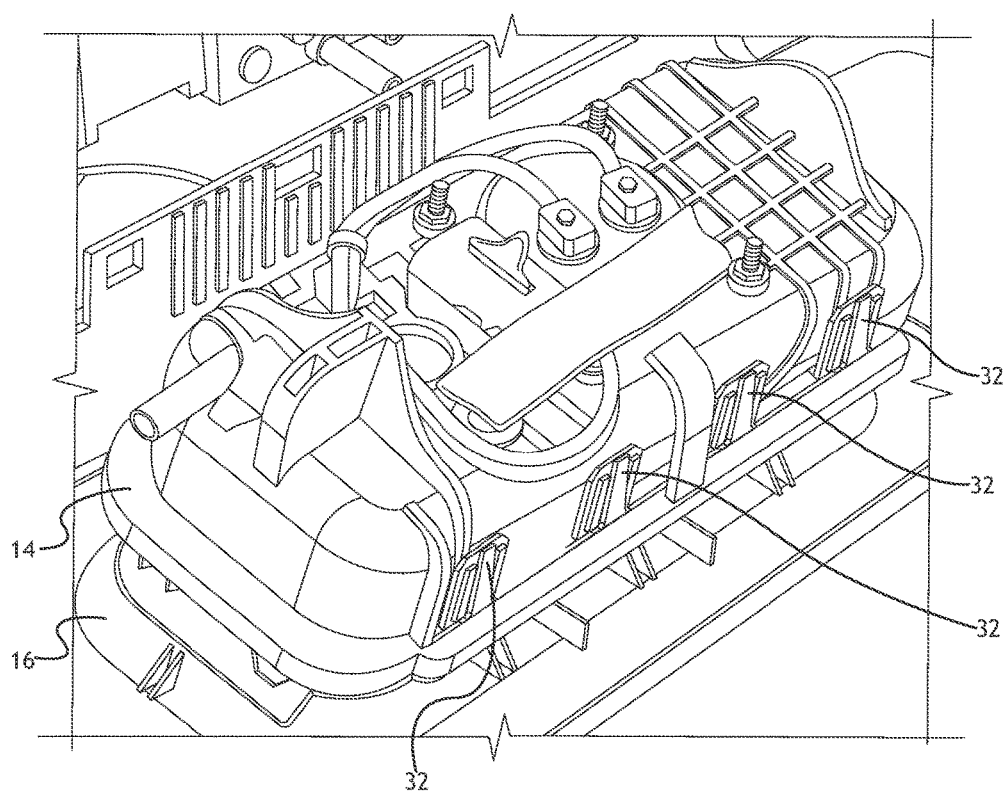
FIG. 6 illustrates a product including an airbag chute and an airbag propellant assembly according to a number of variations.

FIG. 6 illustrates a product including an airbag chute and an airbag propellant assembly according to a number of variations.

Figure 7:
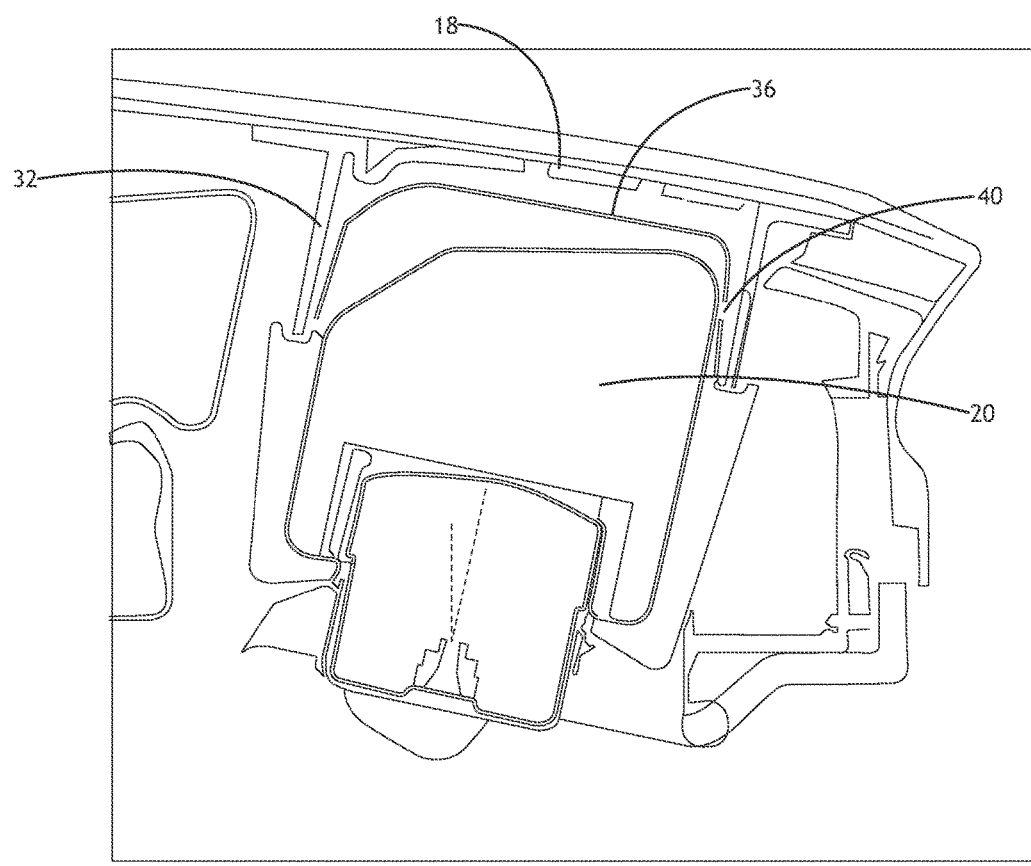
FIG. 7 is an illustration of a sectional view of an airbag assembly according to a number of variations.

FIG. 7 is a sectional view of an airbag assembly according to a number of variations.

Figure 8:
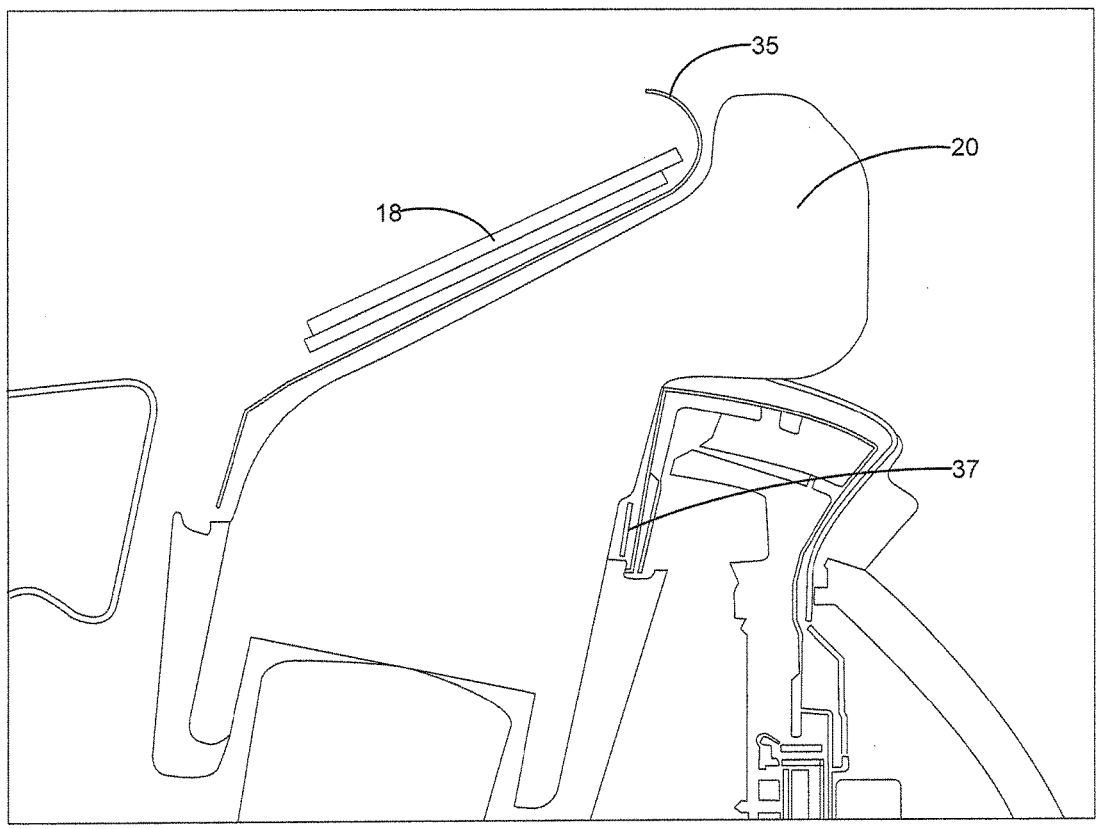
FIG. 8 is a sectional view of an airbag being deployed wherein an airbag cushion protector is interposed between the sharp edges of a deployment door or material to protect the airbag cushion during deployment.

FIG. 8 is a sectional view of an airbag being deployed wherein an airbag cushion protector is interposed between the sharp edges of a deployment door or material to protect the airbag cushion during deployment.

Figure 9:
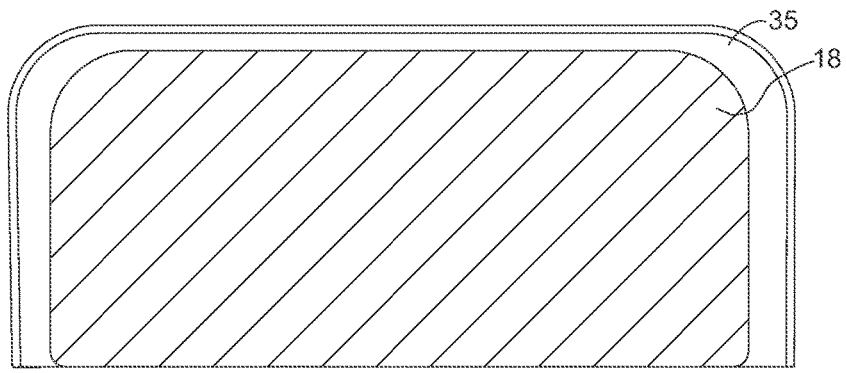
FIG. 9 is an illustration of an airbag cushion protector constructed and arranged to extend past the rearward and side edges of an instrument panel airbag deployment door.

FIG. 9 is an illustration of an airbag cushion protector constructed and arranged to extend past the rearward and side edges of an instrument panel airbag deployment door.

Figure 10A:
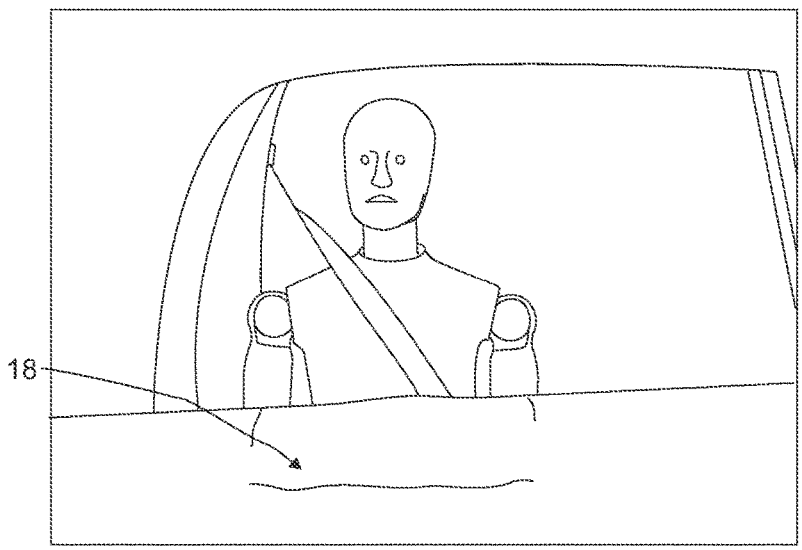
FIG. 10A is an illustration of an airbag assembly shortly after initiating deployment as viewed from the window looking into the passenger cabin and showing the instrument panel door beginning to open.

FIG. 10A is an illustration of an airbag assembly shortly after initiating deployment as viewed from the window looking into the passenger cabin and showing the instrument panel door beginning to open.

Figure 10B:
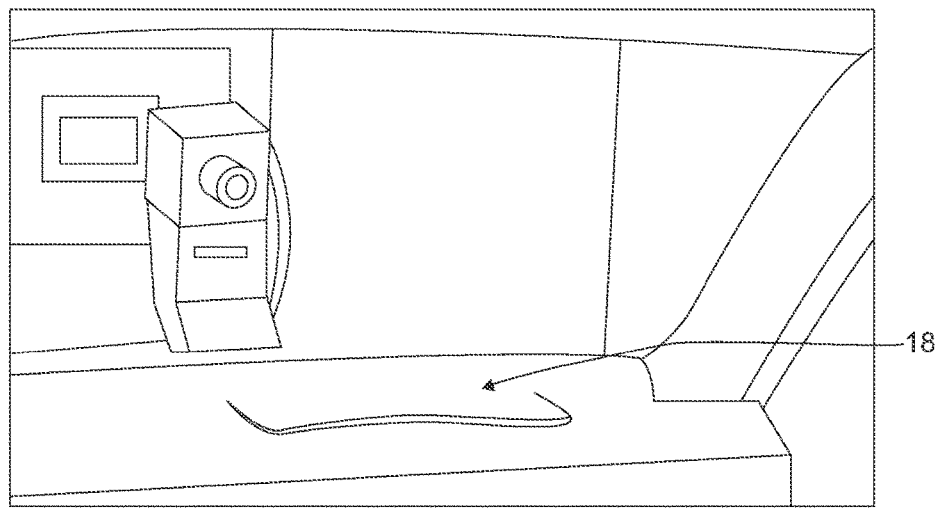
FIG. 10B, like FIG. 10A, is an illustration of an airbag assembly shortly after initiating deployment but viewed from the passenger cabin looking toward the windshield and showing the instrument panel door beginning to open.

FIG. 10B, like FIG. 10A, is an illustration of an airbag assembly shortly after initiating deployment but viewed from the passenger cabin looking toward the windshield and showing the instrument panel door beginning to open.

Figure 10C:
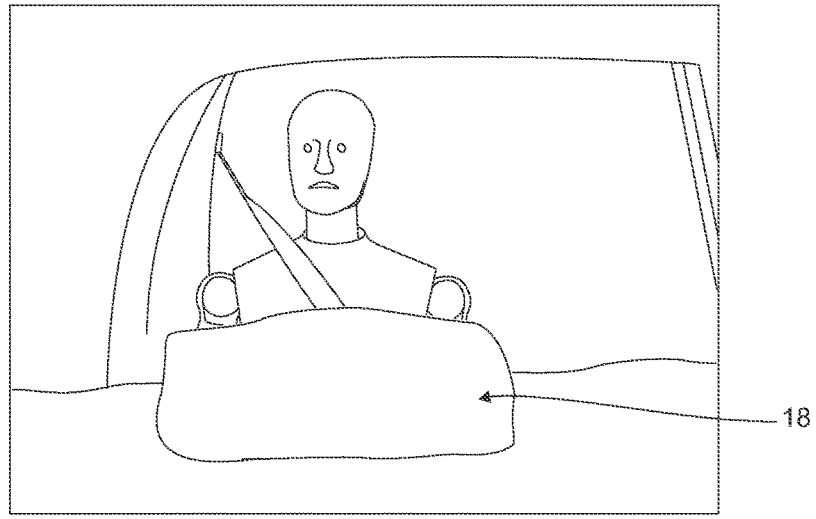
FIG. 10C illustrates the position of the airbag cushion and door at a time shortly after the time illustrated in FIG. 10A.

FIG. 10C illustrates the position of the airbag cushion and door at a time shortly after the time illustrated in FIG. 10A.

Figure 10D:
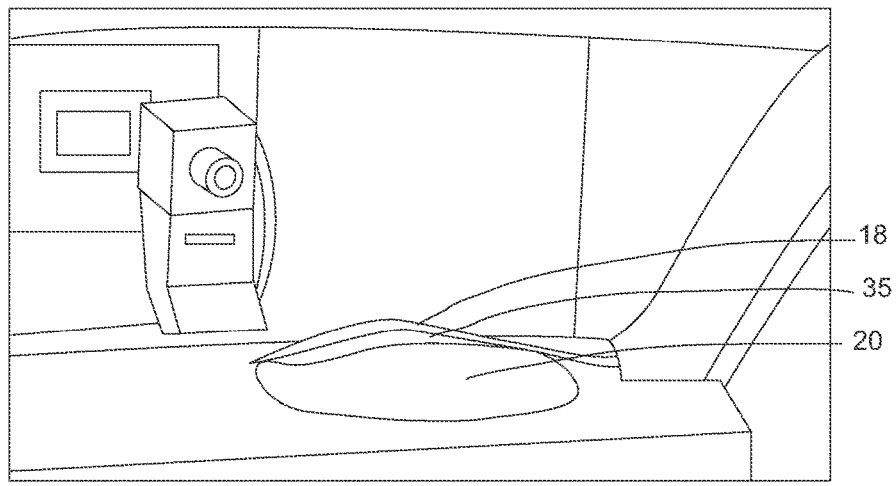
FIG. 10D illustrates the position of the airbag cushion and door at a time shortly after the time illustrated in FIG. 10B.

FIG. 10D illustrates the position of the airbag cushion and door at a time shortly after the time illustrated in FIG. 10B.

Figure 10E:
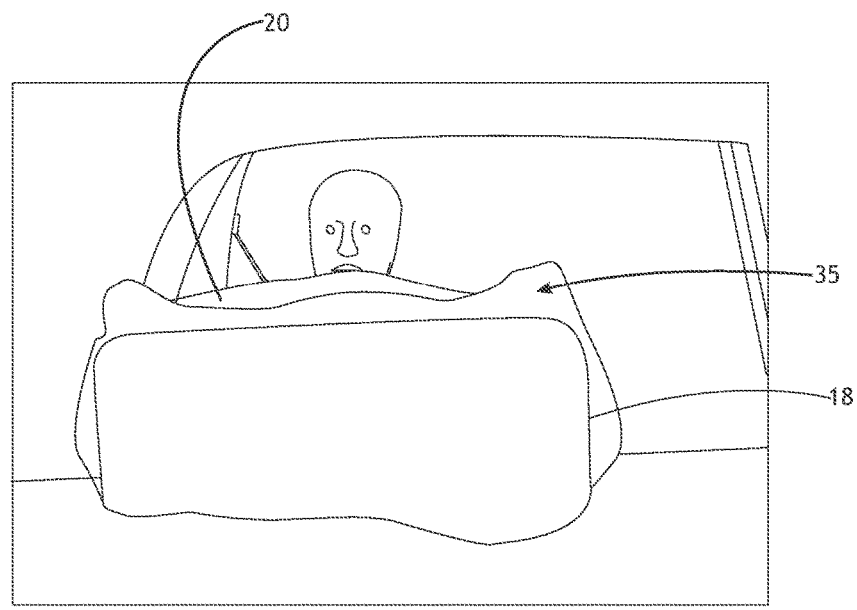
FIG. 10E illustrates the position of the airbag cushion and door, viewed through the windshield, at a time shortly after the time illustrated in FIG. 10C and showing the protector extending beyond the edges of the door during deployment.

FIG. 10E illustrates the position of the airbag cushion and door, viewed through the windshield, at a time shortly after the time illustrated in FIG. 10C and showing the protector extending beyond the edges of the door during deployment.

Figure 10F:
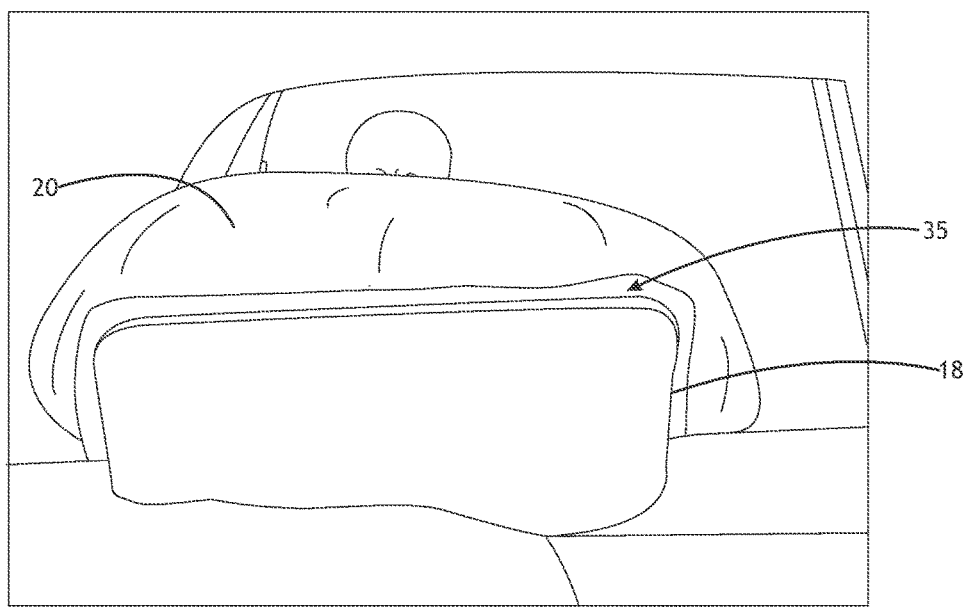
FIG. 10F illustrates the position of the airbag cushion and door, viewed through the windshield, at a time shortly after the time illustrated in FIG. 10E and showing the protector extending beyond the edges of the door during deployment.

FIG. 10F illustrates the position of the airbag cushion and door, viewed through the windshield, at a time shortly after the time illustrated in FIG. 10E and showing the protector extending beyond the edges of the door during deployment.

Figure 10G:
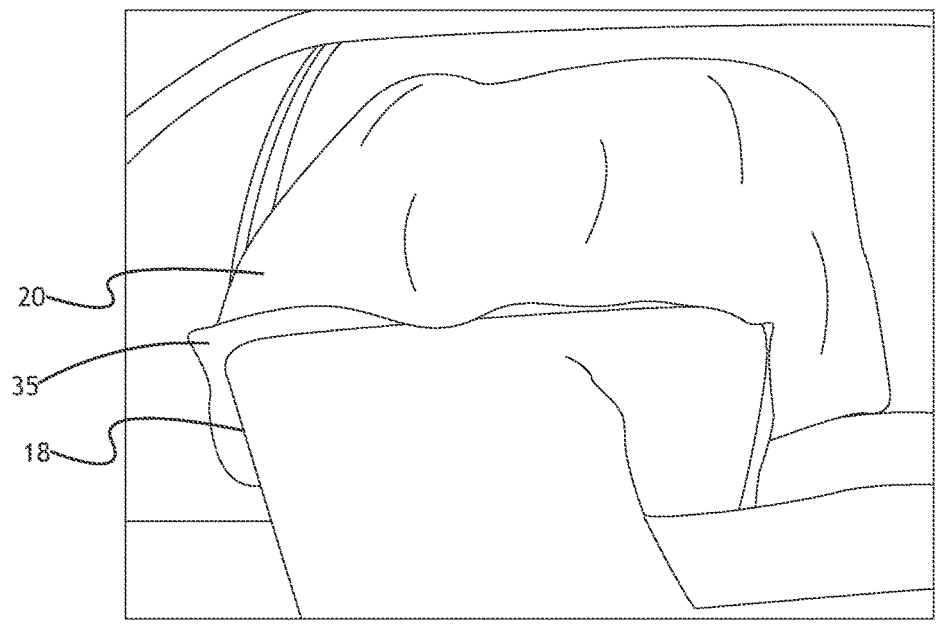
FIG. 10G illustrates the position of the airbag cushion and door, viewed through the windshield, at a time shortly after the time illustrated in FIG. 10F and showing the protector extending beyond the edges of the door during deployment.

FIG. 10G illustrates the position of the airbag cushion and door, viewed through the windshield, at a time shortly after the time illustrated in FIG. 10F and showing the protector extending beyond the edges of the door during deployment.

Figure 10H:
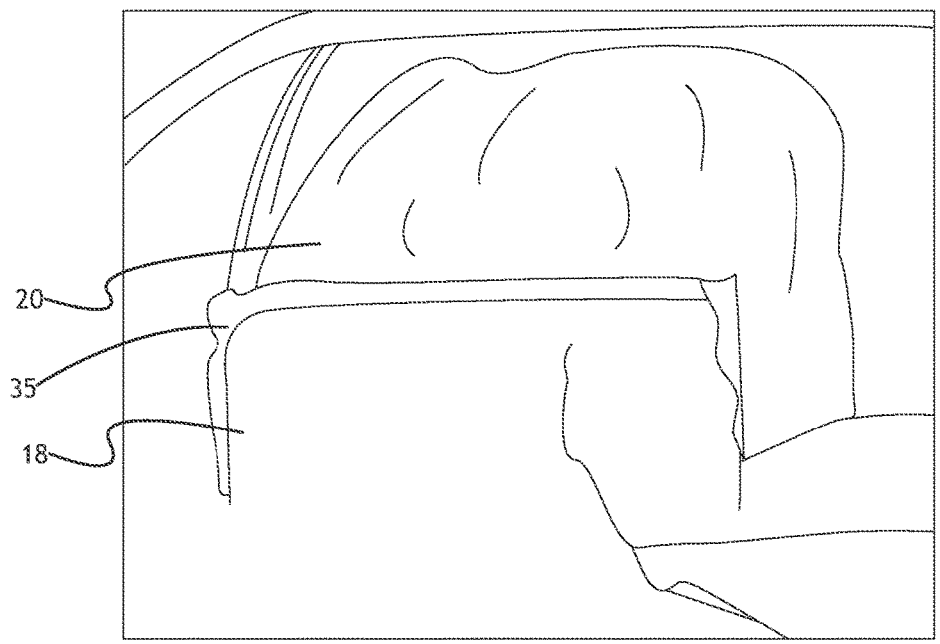
FIG. 10H illustrates the position of the airbag cushion and door, viewed through the windshield, at a time shortly after the time illustrated in FIG. 10G and showing the protector extending beyond the edges of the door and interposed between the airbag cushion and the door during deployment.

FIG. 10H illustrates the position of the airbag cushion and door, viewed through the windshield, at a time shortly after the time illustrated in FIG. 10G and showing the protector extending beyond the edges of the door and interposed between the airbag cushion and the door during deployment.

Figure 10I:
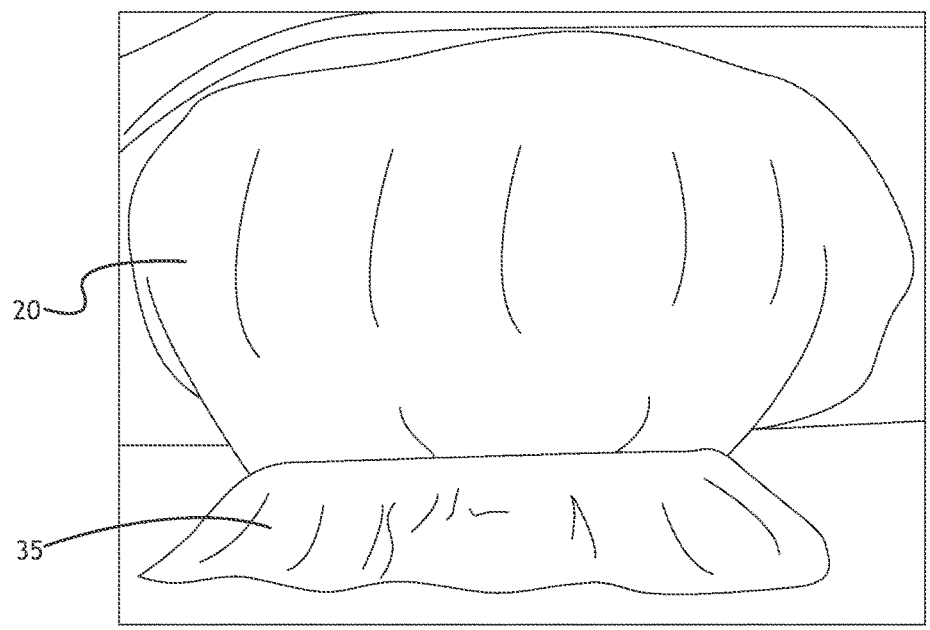
FIG. 10I illustrates the position of the airbag cushion and door, viewed through the windshield, at a time shortly after the time illustrated in FIG. 10H and showing the protector extending beyond the edges of the door and interposed between the airbag cushion and the door during deployment.

FIG. 10I illustrates the position of the airbag cushion and door, viewed through the windshield, at a time shortly after the time illustrated in FIG. 10H and showing the protector extending beyond the edges of the door and interposed between the airbag cushion and the door during deployment.

Of course a number of variations are not limited to application of an airbag cushion protector to use with an instrument panel door. In a number of variations an airbag protector may be constructed and arranged to be used in an airbag assembly for a steering wheel, an A pillar airbag assembly, a B pillar airbag assembly, a C pillar airbag assembly, a roof rail airbag assembly, a center counsel airbag assembly, a knee protection airbag assembly, and an airbag assembly in a seat.

The above description of select examples of the invention is merely exemplary in nature and, thus, variations or variants thereof are not to be regarded as a departure from the spirit and scope of the invention.

What is claimed is:

1. A product comprising an airbag cushion protector constructed and arranged to be placed in an airbag chute; the airbag chute comprising a door portion jointed to a rear wall having an upper edge, a front wall having an upper edge, a first end wall having an upper edge and a second end wall having an upper edge, wherein the airbag chute includes a plurality of tabs extending from one or more walls, a door portion line of weakness extending along the door at the upper edge of the rear wall, the upper edge of the first end wall and the upper edge of the second end wall, the door portion line of weakness being constructed and arranged to allow the door portion to separate from the rear wall, first end wall and second end wall during deployment of an airbag cushion, the door being pivotally connected to the front wall, and the airbag cushion protector includes a plurality of slots, wherein each slot is constructed and arranged to receive one of the plurality of tabs, and wherein the airbag cushion protector is received in the airbag chute so that a first portion of the airbag cushion protector covers at least one edge of an airbag door during deployment of the airbag cushion and so that the first portion of the airbag cushion protector is interposed between the at least one edge of the airbag door and the airbag cushion throughout deployment of the airbag, and wherein the airbag cushion protector is received in the airbag chute so that the airbag cushion protector covers up at least a portion of the first end wall or second end wall.

2. A product as set forth in claim 1 wherein the airbag cushion protector is received in the airbag chute so that the airbag cushion protector covers the door portion of the chute, extends up at least a portion of the rear wall, up at least a portion of the front wall, and up at least a portion of the first end wall and second end wall.

3. A product as set forth in claim 1 wherein the airbag cushion protector includes the first portion and a second portion, which are held together during assembly by a cushion protector line of weakness.

4. A product as set forth in claim 3 wherein the cushion protector line of weakness is constructed and arranged to tear so that the first portion and the second portion of the airbag cushion protector separate during deployment of the airbag and so that the first portion of the airbag cushion protector extends beyond the at least one edge of the door through which the airbag cushion deploys.

5. A product comprising an airbag cushion protector constructed and arranged to be placed in an airbag chute; the airbag chute comprising a door portion jointed to a rear wall having an upper edge, a front wall having an upper edge, a first end wall having an upper edge and a second end wall having an upper edge, a door portion line of weakness extending along the door at the upper edge of the rear wall, the upper edge of the first end wall and the upper edge of the second end wall, the door portion line of weakness being constructed and arranged to allow the door portion to separate from the rear wall, first end wall and second end wall during deployment of an airbag cushion, the door being pivotally connected to the front wall, and the airbag cushion protector received in the airbag chute so that a first portion of the airbag cushion protector covers at least one edge of an airbag door during deployment of the airbag cushion and so that the first portion of the airbag cushion protector is interposed between the at least one edge of the airbag door and the airbag cushion throughout deployment of the airbag, and wherein the airbag cushion protector is received in the airbag chute so that the airbag cushion protector covers up at least a portion of the first end wall or second end wall;
    wherein the airbag cushion protector is received in the airbag chute so that the airbag cushion protector covers the door portion of the chute, extends up at least a portion of the rear wall, up at least a portion of the front wall, and up at least a portion of the first end wall and second end wall;
    wherein the airbag chute includes a plurality of tabs extending from one or more of the walls; and
    wherein each tab is received in one slot of a plurality of slots formed in the airbag cushion protector and constructed and arranged to receive a locking tab or locking finger of an airbag chute.

\* \* \* \* \*